United States Patent
Katukam et al.

(10) Patent No.: US 11,811,556 B2
(45) Date of Patent: Nov. 7, 2023

(54) METHODS AND SYSTEMS FOR NETWORK TRAFFIC MANAGEMENT

(71) Applicant: Nile Global, Inc., Cupertino, CA (US)

(72) Inventors: Suresh Katukam, Milpitas, CA (US); Promode Nedungadi, San Jose, CA (US); Steve Alexander, Woodside, CA (US); Sathish Damodaran, San Jose, CA (US)

(73) Assignee: Nile Global, Inc., San Jose, CA (US)

( * ) Notice: Subject to any disclaimer, the term of this patent is extended or adjusted under 35 U.S.C. 154(b) by 258 days.

(21) Appl. No.: 17/465,773

(22) Filed: Sep. 2, 2021

(65) Prior Publication Data
US 2023/0062466 A1 Mar. 2, 2023

(51) Int. Cl.
*H04L 12/46* (2006.01)
*H04W 76/12* (2018.01)

(52) U.S. Cl.
CPC ...... *H04L 12/4633* (2013.01); *H04L 12/4641* (2013.01); *H04W 76/12* (2018.02)

(58) Field of Classification Search
None
See application file for complete search history.

(56) References Cited

U.S. PATENT DOCUMENTS

| | | | |
|---|---|---|---|
| 11,005,732 | B1 | 5/2021 | Quevedo et al. |
| 2011/0063979 | A1 | 3/2011 | Matthews et al. |
| 2014/0355441 | A1* | 12/2014 | Jain ........................ H04L 45/64 370/254 |
| 2018/0157514 | A1 | 6/2018 | Malloy et al. |
| 2020/0322182 | A1* | 10/2020 | Anshuman .......... H04L 12/4679 |

* cited by examiner

*Primary Examiner* — Christine T Duong
(74) *Attorney, Agent, or Firm* — LOZA & LOZA, LLP

(57) ABSTRACT

Embodiments of a device and method are disclosed. In an embodiment, a method for network traffic management of a network deployed at a customer site involves establishing a wired traffic overlay tunnel between an access switch (AS) of the network deployed at the customer site and a head end (HE) of the network deployed at the customer site, establishing a wireless traffic overlay tunnel between a wireless access point (AP) of the network deployed at the customer site and the HE of the network deployed at the customer site, and conveying network traffic associated with a network device through the wired traffic overlay tunnel or the wireless traffic overlay tunnel based on whether the network device connects to the network through a wired link or connects to the network wirelessly.

20 Claims, 12 Drawing Sheets

METHODS AND SYSTEMS FOR NETWORK TRAFFIC MANAGEMENT

BACKGROUND

Network traffic management plays an important role in ensuring that network deployments meet customer requirements. For example, network traffic management technology can be used to direct network traffic between various network elements in a network. A typical network includes a combination of wired and wireless devices. Network traffic from wired devices and network traffic from wireless devices are typically handled separately by different management devices, which requires coordination among these management devices. In addition, management and troubleshooting network traffic from wired devices and network traffic from wireless devices that are handled separately by different management devices are typically complex. Further, consistent policies, such as network address management, client performance management via quality of service (QoS) policies, security, and access management, typically cannot be applied to both wired and wireless clients. Therefore, there is a need for network traffic management technology that can provide network traffic management for both wired and wireless devices in a network in a simplified and efficient manner.

SUMMARY

Embodiments of a device and method are disclosed. In an embodiment, a method for network traffic management of a network deployed at a customer site involves establishing a wired traffic overlay tunnel between an access switch (AS) of the network deployed at the customer site and a head end (HE) of the network deployed at the customer site, establishing a wireless traffic overlay tunnel between a wireless access point (AP) of the network deployed at the customer site and the HE of the network deployed at the customer site, and conveying network traffic associated with a network device through the wired traffic overlay tunnel or the wireless traffic overlay tunnel based on whether the network device connects to the network through a wired link or connects to the network wirelessly.

In an embodiment, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel when the network device connects to the network through the wired link and conveying the network traffic associated with the network device through the wireless traffic overlay tunnel when the network device connects to the network wirelessly.

In an embodiment, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel or the wireless traffic overlay tunnel based on whether the network device connects to the network through the wired link or connects to the network wirelessly using a network layer architecture of the network.

In an embodiment, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel or the wireless traffic overlay tunnel based on whether the network device connects to the network through the wired link or connects to the network wirelessly using a data plane of the HE.

In an embodiment, establishing the wired traffic overlay tunnel between the AS of the network deployed at the customer site and the HE of the network deployed at the customer site includes at the AS, detecting that a network port becomes operational and sending a tunnel request to the HE, and at the HE, creating the wired traffic overlay tunnel and sending a response back to the wireless AP.

In an embodiment, at the HE, creating the wired traffic overlay tunnel and sending the response back to the wireless AP includes at the HE, creating the wired traffic overlay tunnel and sending the response back to the wireless AP using a control plane and a data plane of the HE.

In an embodiment, establishing the wireless traffic overlay tunnel between the wireless AP of the network deployed at the customer site and the HE of the network deployed at the customer site includes creating an interface using the wireless AP and sending a tunnel request from the wireless AP to the HE, and at the HE, creating the wireless traffic overlay tunnel and sending a response back to the wireless AP.

In an embodiment, at the HE, creating the wireless traffic overlay tunnel and sending the response back to the wireless AP includes at the HE, creating the wireless traffic overlay tunnel and sending the response back to the wireless AP using a control plane and a data plane of the HE.

In an embodiment, conveying the network traffic associated with the network device through the wired traffic overlay tunnel or the wireless traffic overlay tunnel based on whether the network device connects to the network through the wired link or connects to the network wirelessly includes when a packet is received from a wireless client, mapping a basic service set identifier (BSSID) associated with the packet to the wireless traffic overlay tunnel and transmitting the packet within the wireless traffic overlay tunnel after link layer information is removed from the packet.

In an embodiment, conveying the network traffic associated with the network device through the wired traffic overlay tunnel or the wireless traffic overlay tunnel based on whether the network device connects to the network through the wired link or connects to the network wirelessly includes when a packet is received from a wired client, mapping a network port associated with the packet to the wired traffic overlay tunnel and transmitting the packet within the wired traffic overlay tunnel after link layer information is removed from the packet.

In an embodiment, at least one of the wired traffic overlay tunnel and the wireless traffic overlay tunnel includes a Generic Routing Encapsulation (GRE) tunnel or a Virtual Extensible Local Area Network (VXLAN).

In an embodiment, the HE is connected to the wireless AP through the AS.

In an embodiment, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel when the network device connects to the AS through the wired link and conveying the network traffic associated with the network device through the wireless traffic overlay tunnel when the network device wirelessly connects to the wireless AP.

In an embodiment, a system for network traffic management of a network deployed at a customer site includes memory and one or more processors configured to establish a wired traffic overlay tunnel between an AS of the network deployed at the customer site and an HE of the network deployed at the customer site, establish a wireless traffic overlay tunnel between a wireless AP of the network deployed at the customer site and the HE of the network deployed at the customer site; and convey network traffic associated with a network device through the wired traffic overlay tunnel or the wireless traffic overlay tunnel based on whether the network device connects to the network through a wired link or connects to the network wirelessly.

In an embodiment, the one or more processors are further configured to convey the network traffic associated with the network device through the wired traffic overlay tunnel when the network device connects to the network through the wired link and convey the network traffic associated with the network device through the wireless traffic overlay tunnel when the network device connects to the network wirelessly.

In an embodiment, the one or more processors are further configured to convey the network traffic associated with the network device through the wired traffic overlay tunnel or the wireless traffic overlay tunnel based on whether the network device connects to the network through the wired link or connects to the network wirelessly using a network layer architecture of the network.

In an embodiment, the one or more processors are further configured to using the AS, detect that a network port becomes operational and sending a tunnel request to the HE and using the HE, create the wired traffic overlay tunnel and sending a response back to the wireless AP.

In an embodiment, the one or more processors are further configured to create an interface using the wireless AP and sending a tunnel request from the wireless AP to the HE and using the HE, create the wireless traffic overlay tunnel and sending a response back to the wireless AP.

In an embodiment, the one or more processors are further configured to when a packet is received from a wireless client, map a BSSID associated with the packet to the wireless traffic overlay tunnel and transmit the packet within the wireless traffic overlay tunnel after link layer information is removed from the packet.

In an embodiment, a method for network traffic management of a network deployed at a customer site involves establishing a wired traffic overlay tunnel between an AS of the network deployed at the customer site and an HE of the network deployed at the customer site, establishing a wireless traffic overlay tunnel between a wireless AP of the network deployed at the customer site and the HE of the network deployed at the customer site, where the HE is connected to the wireless AP through the AS, and where at least one of the wired traffic overlay tunnel and the wireless traffic overlay tunnel includes a GRE tunnel or a VXLAN; and conveying network traffic associated with a network device through the wired traffic overlay tunnel or the wireless traffic overlay tunnel based on whether the network device connects to the network through a wired link or connects to the network wirelessly.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
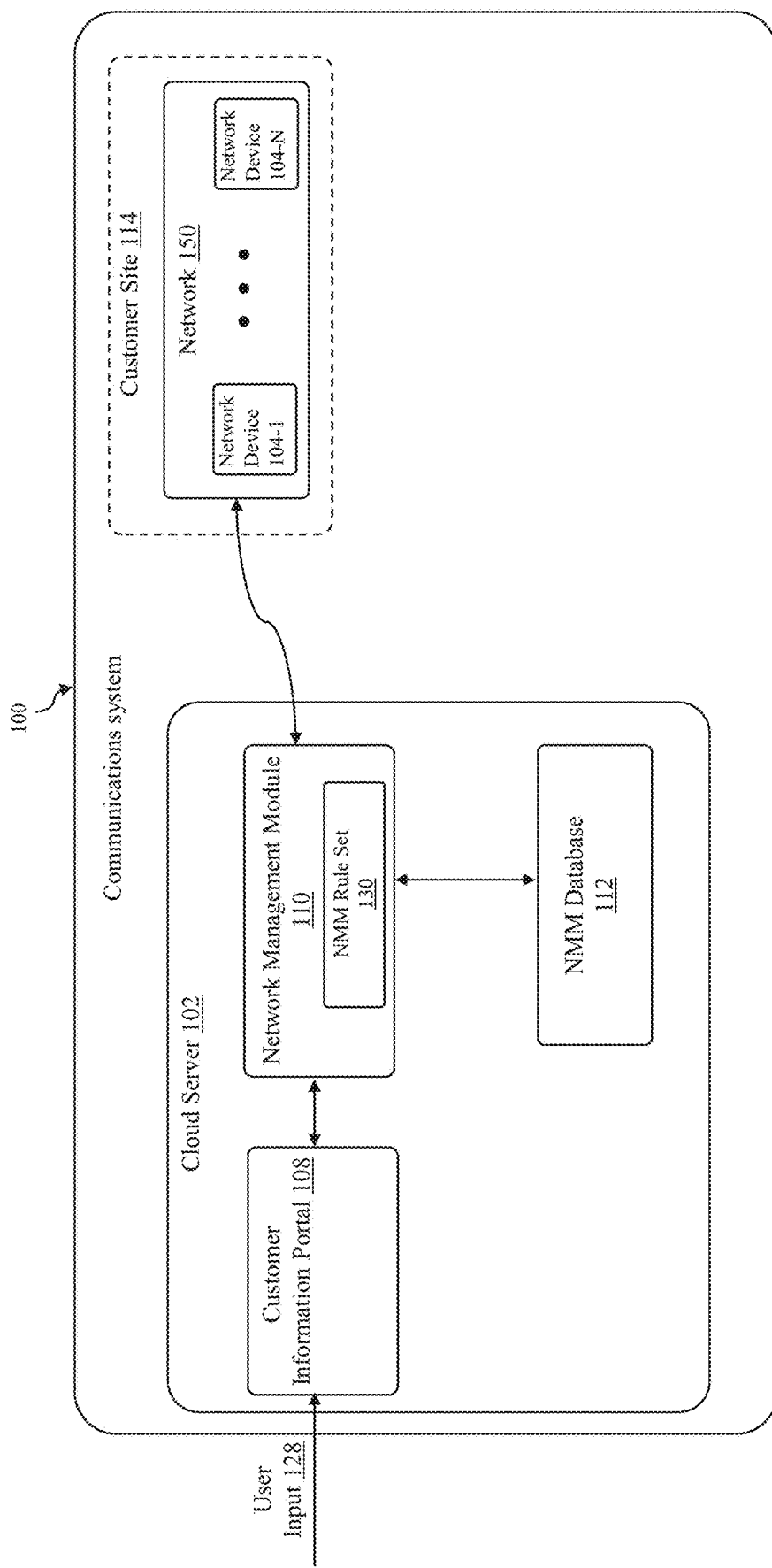
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a network traffic management service) to network devices (e.g., the deployed network 150) at the customer site. Because the cloud server can facilitate or perform a network traffic management service or operation for network devices at the customer site, network traffic management efficiency can be improved. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service (e.g., a network traffic management service) to network devices (e.g., the deployed network 150) at the customer site 114, for example, using an NMM rule set 130. The NMM rule set 130 may include one or more NMM rules (e.g., network traffic management rules) for network devices at the customer site 114, for example, for performing an NMM service (e.g., network traffic management) to network devices at the customer site 114. In some embodiments, the NMM module 110 is configured to generate and/or transmit at least one alert (e.g., a network traffic management alert or error) regarding a network deployed and/or to be deployed at the customer site or a network operator site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). In some embodiments, the NMM database 112 is configured to store the at least one NMM alert. Because the NMM module can facilitate or perform network traffic management for network devices at the customer site, network traffic management efficiency can be improved. In addition, because the NMM deployment module can facilitate or perform a network traffic management service or operation for network devices at the customer site, an administrator or a customer can be notified of network conditions. Consequently, network outage or low performance time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service (e.g., a network traffic management service) for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, ..., 104-N, where N is a positive integer. In some embodiments, at least one of the one or more network devices 104-1, ..., 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, ..., 104-N is compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, ..., 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, ..., 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless device (e.g., a wireless sensor) that wirelessly connects to a wireless AP or at least one wired device that is connected the at least one wireless AP or the at least one AS through at least one electrical cable. In some embodiments, at least one of the one or more network devices 104-1, ..., 104-N is a wireless station (STA) that wirelessly connects to a wireless AP. For example, at least one of the one or more network devices 104-1, ..., 104-N may be a laptop, a desktop personal computer (PC), a mobile phone, or other wireless device that supports at least one WLAN communications protocol (e.g., an IEEE 802.11 protocol)).

Figure 2:
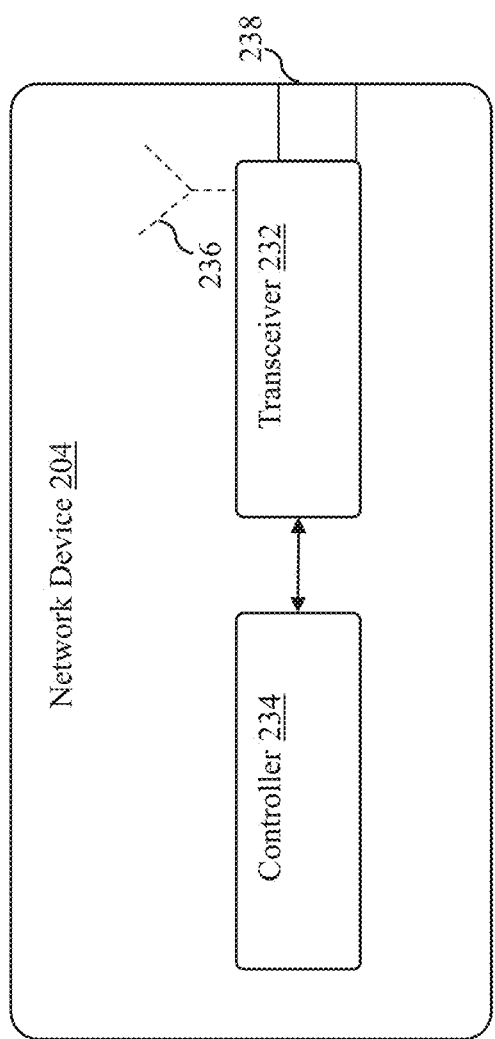
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device 104-1, ..., or 104-N that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor, described in more detail with reference to FIG. 3. In some embodiments, the network device 204 is a wired device. In some embodiments, the network device 204 is a wireless device. In some embodiments, the network device 204 is a wired device with wireless capability, for example, a wireless access point. In the embodiment depicted in FIG. 2, a network device 204 includes a wired and/or wireless transceiver 232, a controller 234 operably connected to the transceiver 232, at least one optional antenna 236 operably connected to the transceiver 232, and at least one network port 238 operably connected to the transceiver 232. In some embodiments, the transceiver 232 includes a physical layer (PHY) device. In some embodiments, the at least one network port 238 is optional and is not included. The transceiver 232 may be any suitable type of transceiver. For example, the transceiver 232 may be a short-range communications transceiver (e.g., a Bluetooth transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth transceiver) and a WLAN transceiver (e.g., a transceiver compatible with an IEEE 802.11 protocol). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
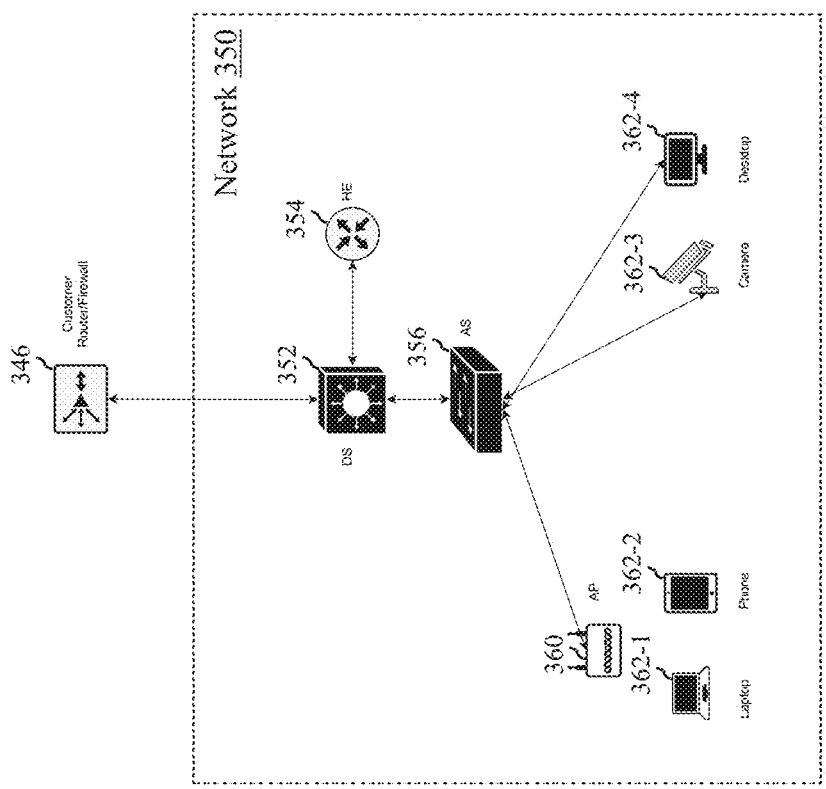
FIG. 3 depicts an embodiment of a network that can be deployed at a customer site.

FIG. 3 depicts an embodiment of a network 350 that can be deployed at the customer site 114. The network 350 depicted in FIG. 3 is one possible embodiment of the deployed network 150 at the customer site 114 depicted in FIG. 1. However, the deployed network 150 at the customer site 114 depicted in FIG. 1 is not limited to the embodiment shown in FIG. 3. In some embodiments, the network 350 is a basic building block for providing connectivity as a service and is a replicable block that can be scaled (e.g., expanded). In the embodiment depicted in FIG. 3, the network 350 includes a distribution switch (DS) or distribution layer switch 352 that may be an aggregation switch functioning as a bridge between core layer switches and access layer switches, a head end (HE) appliance or gateway 354, an access switch (AS) 356 that can interact with lower level devices (e.g., wireless APs), a wireless AP 360 connected to the AS, a number of wireless devices 362-1, 362-2 that wirelessly connect to the wireless AP and may be implemented as a laptop computer and a mobile phone that can be used by at least one user (e.g., an employee, a guest, or a partner), respectively, and a number of wired devices 362-3, 362-4 that connect to the AS and may be implemented as a camera and a desktop computer, respectively. In some embodiments, at least one of the DS 352, the HE 354, the AS 356, the wireless AP 360, and the communications devices 362-1, 362-2, 362-3, 362-4 depicted in FIG. 3 is implemented as the network device 204 depicted in FIG. 2. In some embodiments, at least one additional network device, such as a wireless sensor configured to measure and monitor network information at the customer site 114, is included in the network 350. In the embodiment depicted in FIG. 3, the network 350 (e.g., the DS 352) is connected to a customer router and firewall 346. The customer router and firewall 346 may be connected to a public network, e.g., the Internet. In some embodiments, the network 350 is connected to other network elements, such as an authentication server (e.g., a Remote Authentication Dial-In User Service (RADIUS) server), a Dynamic Host Configuration Protocol (DHCP) server, and/or a wide area network (WAN).

In the embodiment depicted in FIG. 3, the wireless AP 360 provides wireless access to the wireless devices 362-1, 362-2 that may be implemented as a laptop computer and a mobile phone, respectively. The wireless AP is connected to the AS 356, which in turn is connected to the DS 352. The AS provides wired access to the wired devices 362-3, 362-4 that may be implemented as a camera and a desktop computer, respectively. The DS 352 is connected to the HE 354 and the customer's upstream firewall/router 346. Wireless clients (e.g., the wireless devices 362-1, 362-2) access the network 350 via the wireless AP 360 using a standard communications protocol, e.g., IEEE 802.11 protocols. Wired Clients access (e.g., the wired devices 362-3, 362-4) access the network 350 via the wired AS 356. In some embodiments, the HE 354 terminates tunnels from the wireless AP 360 and the AS 356, which are established using a signaling protocol. In some embodiments, wireless and/or wired clients (e.g., the wireless devices 362-1, 362-2 and the wired devices 362-3, 362-4) are bound to a corresponding network segment based on a policy and their behaviors. For example, a client may connect to the network 350, be bound to an initial segment, perform an authentication action, and be bound to a different segment depending on the success or failure of that authentication action. In some embodiments, each network segment is a different subnet of the network 350 having a unique subnet mask. Each segment or subnet of the network 350 can act as its own small network, which allows flow of traffic between subnets to be controlled based on granular policies or rules. Network (IP) addresses may be assigned to clients based on which segment they are using. In some embodiments, a network segment is a logical L3 (i.e., layer 3, the network layer in the 7-layer Open Systems Interconnection (OSI) model) construct that provides an L3 interface point for client traffic to enter and exit the network 350 to the upstream customer equipment (e.g., the upstream firewall/router 346). QoS, security, and other policies may be enforced at the HE 354. In some embodiments, multiple WLAN APs are present in the network 350. In these embodiments, each wireless AP is connected to an access switch. Depending on the size of the installation, one or more distribution switches (DS) may also be present. If a distribution switch is not present, an access switch can perform its functions.

In some embodiments, wireless and/or wired clients (e.g., the wireless devices 362-1, 362-2 and the wired devices 362-3, 362-4) are assigned or grouped to a corresponding network segment based on their desired behaviors. Examples of different behaviors include:
  Network Quality of Service (for example, employee traffic being prioritized over guest traffic); and
  Blocking access to resources (for example, unauthenticated clients, or clients that have not passed a security posture check should not be allowed to access important servers due to the risk that they pose).

Depending on the access method, clients can be assigned to a segment in one of several ways:
  Default—for example, what ESSID (WLAN) the client associated to;
  Manual—for example, a wired client may be restricted until the customer approves it and assigns it to a specific segment; and
  Automatic—for example, an external authentication server may return information that can be used to assign a client to a segment based on the result of an authentication process.

In some embodiments, each network segment is a different subnet of the network 350 having a unique subnet mask. Each segment or subnet of the network 350 can act as its own small network, which allows flow of traffic between subnets to be controlled based on granular policies or rules. Network (IP) addresses may be assigned to clients based on which segment they are using.

Figure 4:
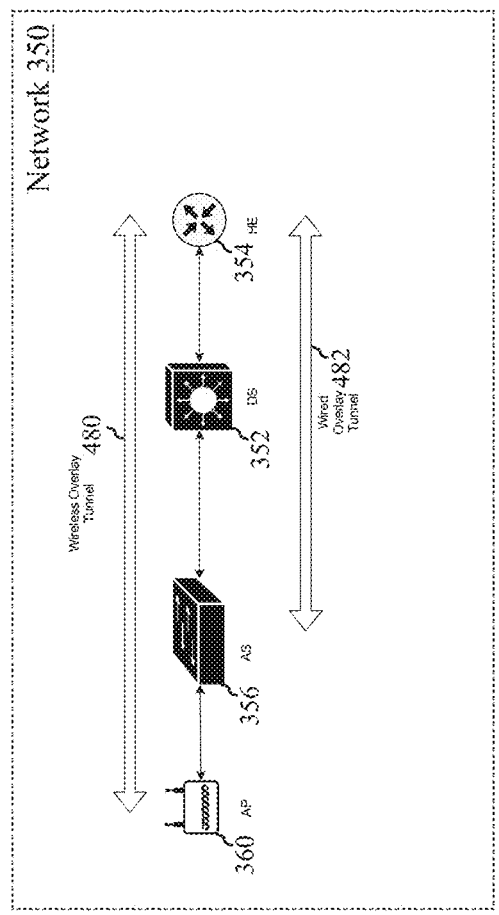
FIG. 4 depicts a tunnel overlay configuration of the network depicted in FIG. 3 in relation to the underlying physical topology.

FIG. 4 depicts a tunnel overlay configuration of the network 350 depicted in FIG. 3 in relation to the underlying physical topology (i.e., the physical links between network elements (e.g., the wireless AP 360, the AS 356, the DS 352, and the HE 354). Network overlay may represent logical connections between elements that allow client traffic to traverse the underlying network irrespective of its physical topology. Inside the network 350, the wireless AP 360, the AS 356, the DS 352, and the HE 354 are all connected via physical links such as Ethernet. In the tunnel overlay configuration depicted in FIG. 4, a wireless traffic overlay tunnel 480 is established between the wireless AP 360 and the HE 354 for wireless traffic, and a wired traffic overlay tunnel 482 is established between the AS 356 and the HE 354 for wired traffic. The tunnel overlay configuration depicted in FIG. 4 is one possible embodiment of the tunnel overlay configuration of the network 350 depicted in FIG. 3. However, the tunnel overlay configuration of the network 350 depicted in FIG. 3 is not limited to the embodiment shown in FIG. 4. In some deployment, multiple tunnels may be established between multiple APs and AS elements to the HE.

In some embodiments, tunnel establishment involves certain information and configuration, such as customer DHCP server infrastructure addresses and address ranges that one or more DHCP servers manage, customer authentication, authorization, and accounting (AAA) server infrastructure addresses and credentials, the desired set of WLANs to advertise and their mode of operation, and the desired set of network segments, including the relationships to the customer DHCP and AAA infrastructure. The configuration can be obtained from a cloud-based management system (e.g., the cloud server 102 depicted in FIG. 1) or multiple sources. Additionally, the wireless AP 360 and the AS 356 learn the network address of the HE 354, for example, via DHCP or other mechanisms such as manual provisioning.

Figure 5:
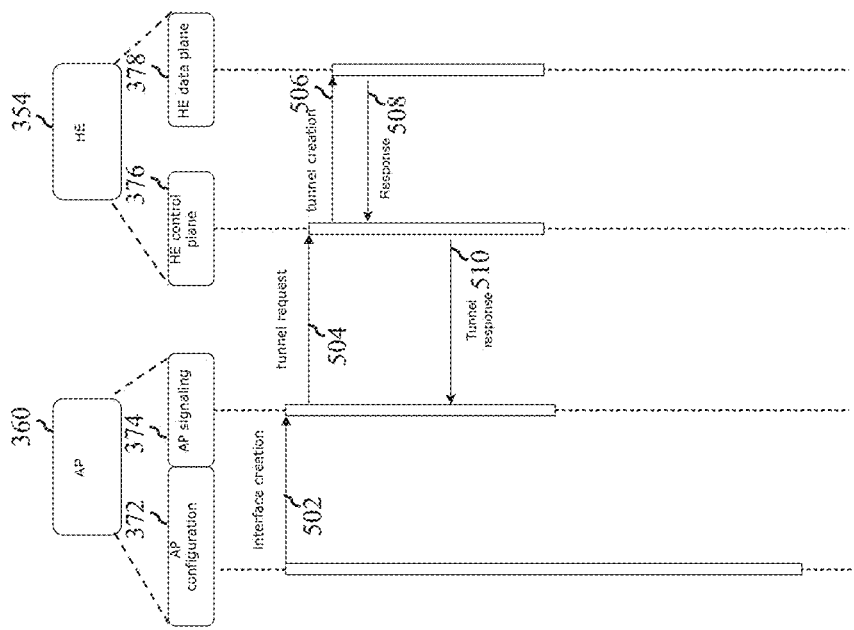
FIG. 5 shows a swim-lane diagram illustrating an example procedure for establishing a wireless traffic overlay tunnel in the communications system depicted in FIG. 1.

FIG. 5 shows a swim-lane diagram illustrating an example procedure for establishing a wireless traffic overlay tunnel in the communications system 100 depicted in FIG. 1. When a network configuration is received by the wireless AP 360 and the HE 354, the wireless AP 360 creates a wireless traffic overlay tunnel (e.g., a Generic Routing Encapsulation (GRE) tunnel, a Virtual Extensible Local Area Network (VXLAN), or other suitable type of tunnel) with the HE 354. A signaling protocol may be used to coordinate the tunnel establishment between the wireless AP 360 and the HE 354. Although operations in the example procedure in FIG. 5 are described in a particular order, in some embodiments, the order of the operations in the example procedure may be altered so that certain operations may be performed in an inverse order or so that certain operations may be performed, at least in part, concurrently with other operations.

In operation 502, an interface is created by an AP configuration module 372 of the wireless AP 360, which prompts an AP signaling protocol module 374 of the wireless AP 360 to sends a tunnel request to the HE 354 in operation 504. In the HE 354, an HE control plane 376 provisions an HE data plane 378 by creating a wireless traffic overlay tunnel (e.g., the wireless traffic overlay tunnel 480 depicted in FIG. 4) in operation 506. In some embodiments, a control plane includes signaling protocols and logic to manage the state associated with a tunnel or client. In some embodiments, a data plane includes the traffic being sent and received between clients and other network elements or external services such as a public website or an internal application. In some embodiments, a control plane determines how packets should be forwarded and a data plane, which is also referred to as a forwarding plane, forwards the packets accordingly. The HE data plane 378 sends a response back to the HE control plane 376 in operation 508. When the wireless traffic overlay tunnel is created, a response is sent back from the HE 354 to the wireless AP in operation 510. The AP configuration module 372, the AP signaling protocol module 374, the HE control plane 376, and/or the HE data plane 378 may be implemented in hardware (e.g., circuits), software, firmware, or a combination thereof. In some embodiments, wireless traffic overlay tunnels are established per basic service set identifier (BSSID). In some embodiments, traffic for a wireless client that associates with a specific BSSID is sent and received over a corresponding wireless traffic overlay tunnel to the HE 354 for processing. In an embodiment, only wireless housekeeping functions are processed in the wireless AP 360. In some embodiments, the authentication function is split between the wireless AP 360 and the HE 354 in the case where IEEE 802.1X authentication is used. In some embodiments, for unauthenticated access (e.g., an open system) or pre-shared key (PSK), the authentication function is performed solely in the AP. In some embodiments, WLAN Extended Service Set Identification (ESSID) configuration is used by the HE 354 to place client traffic in a network segment selected by the configuration.

Figure 6:
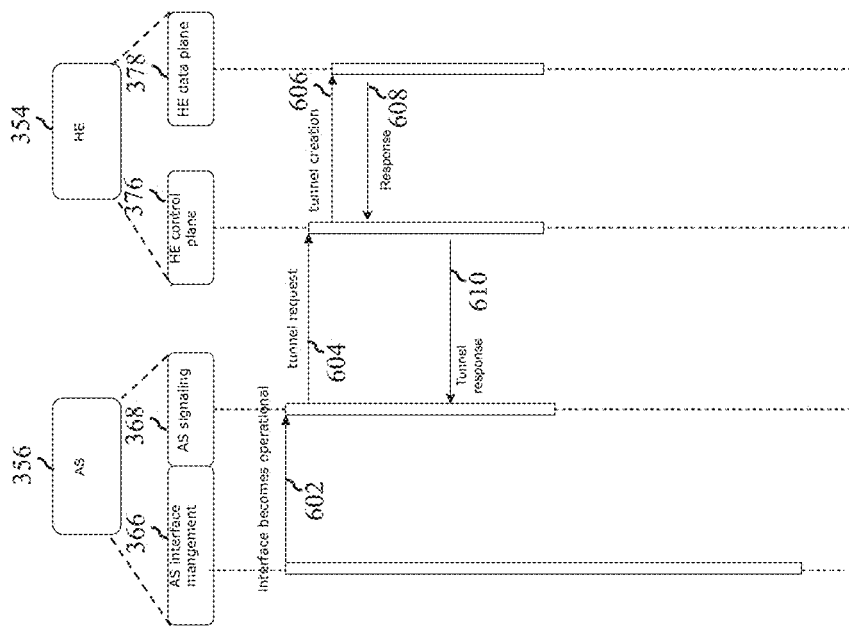
FIG. 6 shows a swim-lane diagram illustrating an example procedure for establishing a wired traffic overlay tunnel in the communications system depicted in FIG. 1.

FIG. 6 shows a swim-lane diagram illustrating an example procedure for establishing a wired traffic overlay tunnel in the communications system 100 depicted in FIG. 1. When the HE network address is received by the AS 356, the AS 356 creates a wired traffic overlay tunnel (e.g., a GRE tunnel, a VXLAN, or other suitable type of tunnel) to the HE using a signaling protocol, which may be identical to the signaling protocol used to coordinate the tunnel establishment between the wireless AP 360 and the HE 354. One difference in the behavior in the wired case is that tunnels are established and removed based on the state of the physical link, such as an Ethernet port. For example, if no client is connected to a port, then no tunnel will be established. Similarly, if a client is disconnected, the port is considered "down", and the corresponding tunnel is removed. Although operations in the example procedure in FIG. 6 are described in a particular order, in some embodiments, the order of the operations in the example procedure may be altered so that certain operations may be performed in an inverse order or so that certain operations may be performed, at least in part, concurrently with other operations.

In operation 602, an AS interface management module 366 of the AS 356 detects that a port (link) has become operational and an AS signaling module 368 of the AS sends a tunnel request to the HE 354 in operation 604. When the tunnel request is received by the HE 354, the HE operates similarly as in the case of wireless traffic tunnel. Specifically, in the HE 354, the HE control plane 376 provisions the HE data plane 378 by creating a wired traffic overlay tunnel (e.g., the wired traffic overlay tunnel 482 depicted in FIG. 4) in operation 606. The HE data plane 378 sends a response back to the HE control plane 376 in operation 608. When the wired traffic overlay tunnel is created, a response is sent back from the HE 354 to the wireless AP in operation 610. The AS interface management module 366, the AS signaling module 368, the HE control plane 376, and/or the HE data plane 378 may be implemented in hardware (e.g., circuits), software, firmware, or a combination thereof.

In some embodiments, unified traffic forwarding for wired and wireless clients is performed in the communications system 100 depicted in FIG. 1. Compared to an approach in which network traffic from wired clients and network traffic from wireless clients are handled separately, under unified traffic forwarding for wired and wireless clients, communication between wired and wireless clients can be coordinated solely in one device, for example, the HE 354. In addition, client endpoint behavior is largely common between wireless and wired clients, allowing for simplified management and troubleshooting. Further, consistent policies, such as, network address management, client performance management via quality of service (QoS) policies, and security and access management can be applied to clients irrespective of their connectivity method.

Figure 7:
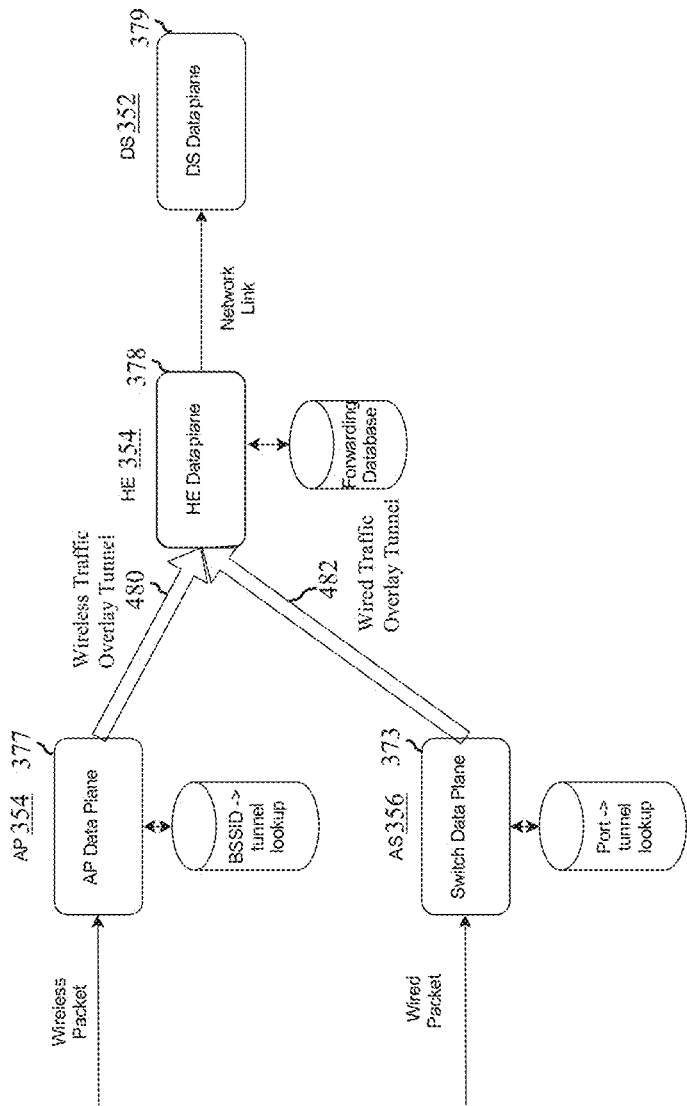
FIG. 7 shows an upstream traffic flow diagram of an example unified traffic forwarding procedure for wired and wireless clients in the communications system depicted in FIG. 1.

FIG. 7 shows an upstream traffic flow diagram as a result of an example unified traffic forwarding procedure for wired and wireless clients in the communications system 100 depicted in FIG. 1. A packet is received from a client and placed into the appropriate overlay tunnel. In the case in which a packet is received from a wireless client, the BSSID associated with the packet is mapped to the wireless traffic overlay tunnel 480 by an AP data plane 377 of the wireless AP 360 and the packet is transmitted using the wireless traffic overlay tunnel after link layer information is removed. In the case in which a packet is received from a wired client, a switch data plane 373 of the AS 356 maps a network port associated with the packet to the wired traffic overlay tunnel 482 and the packet is transmitted after the link-layer information is removed. When the packet is received at the HE 354, the de-encapsulated packet is received by the HE data plane 378 of the HE 354, a forwarding lookup is performed and the packet is sent to the DS 352 over an appropriate network link. The data plane in the DS 352 forwards the packet to the customer's upstream router 346 (shown in FIG. 3). In some embodiments, tunneled packets traverse the DS 352 but the DS 352 does not inspect the traffic. Although operations in the example procedure in FIG. 7 are described in a particular order, in some embodiments, the order of the operations in the example procedure may be altered so that certain operations may be performed in an inverse order or so that certain operations may be performed, at least in part, concurrently with other operations.

Figure 8:
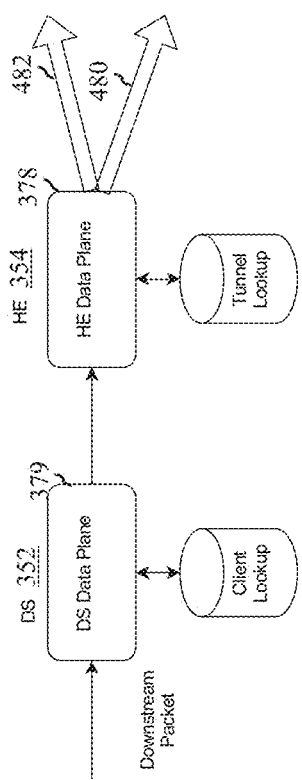
FIG. 8 shows a downstream traffic flow diagram of an example unified traffic forwarding procedure for wired and wireless clients in the communications system depicted in FIG. 1.

FIG. 8 shows a downstream traffic flow diagram of an example unified traffic forwarding procedure for wired and wireless clients in the communications system 100 depicted in FIG. 1. A packet is received from the customer's router 346 (FIG. 3) by the DS 352 and placed into the appropriate overlay tunnel. The DS data plane 379 of the DS 352 forwards the packet to the HE 354, for example, based on client lookup results. The HE data plane 378 looks up the tunnel for the destination client and determines whether to send the packet over the wireless traffic overlay tunnel 480 or the wired traffic overlay tunnel 482. The HE sends the packet to a destination wireless client through the wireless traffic overlay tunnel 480 or to a destination wired client through the wired traffic overlay tunnel 480. The downstream element (not shown) forwards the packet on to the client. In the case in which a network includes multiple HEs, the DS 352 needs to know which HE to forward the packet to. In some embodiments, each HE advertises its information to the DS 352 via a distribution protocol and the DS data plane 379 of the DS 352 resolves the destination HE in its client database and sends the packet to the appropriate HE. Although operations in the example procedure in FIG. 8 are described in a particular order, in some embodiments, the order of the operations in the example procedure may be altered so that certain operations may be performed in an inverse order or so that certain operations may be performed, at least in part, concurrently with other operations.

In some approaches, network traffic management of a network is performed at L2 (i.e., layer 2, the data link layer in the 7-layer OSI model). For example, wireless networks can be mapping from wireless local area networks (WLANs) to virtual local area networks (VLANs) and network traffic can be bridged between the WLANs and the VLANs and then backhauled to a WLAN controller over a network layer using an encapsulation technology using L2 architectures. However, because L2 architectures are typically complex to implement, the complexity of a network can be increased. For example, Institute of Electrical and Electronics Engineers (IEEE) 802.1Q Spanning Tree may be required to implemented L2 architectures. In the unified traffic forwarding procedure of FIGS. 7 and 8, network traffic management is performed at L3 (i.e., layer 3, the network layer in the 7-layer OSI model). Consequently, network traffic management does not rely on complex L2 architectures and can be executed via cost-efficient L3 architectures.

Figure 9:
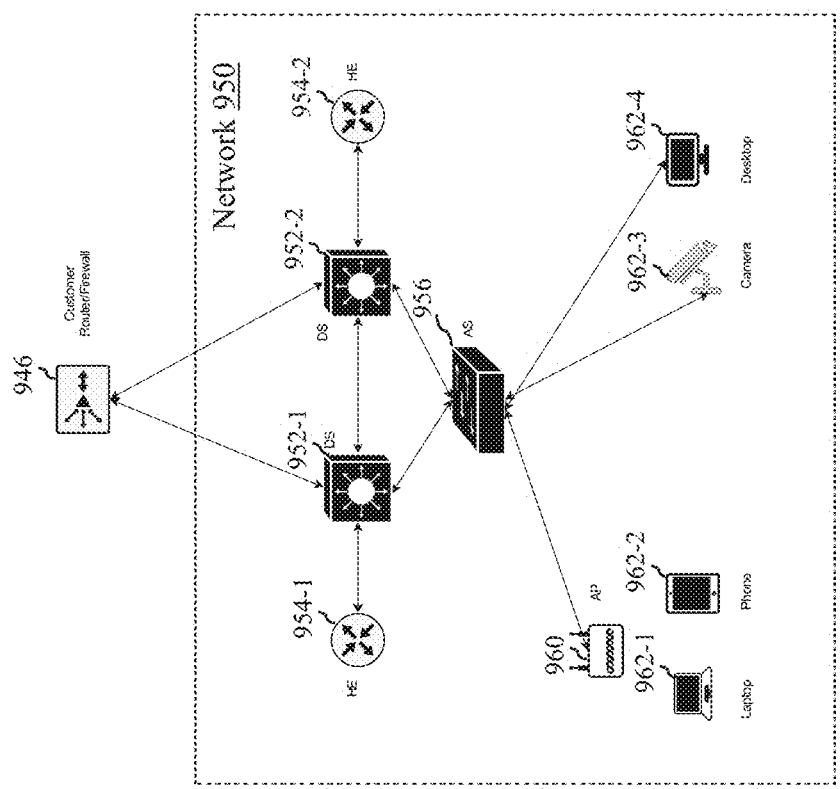
FIG. 9 depicts an embodiment of a network that can be deployed at the customer site depicted in FIG. 1 that includes a redundant deployment.

FIG. 9 depicts an embodiment of a network 950 that can be deployed at the customer site 114 depicted in FIG. 1 that includes a redundant deployment. The network 950 depicted in FIG. 9 is one possible embodiment of the deployed network 150 at the customer site 114 depicted in FIG. 1. However, the deployed network 150 at the customer site 114 depicted in FIG. 1 is not limited to the embodiment shown in FIG. 9. In some embodiments, the network 950 is a basic building block for providing connectivity as a service and is a replicable block that can be scaled (e.g., expanded). In the embodiment depicted in FIG. 9, the network 950 includes two DSs 952-1, 952-2, two HEs 954-1, 954-2, an AS 956, a wireless AP 960 connected to the AS, a number of wireless devices 962-1, 962-2 that wirelessly connect to the wireless AP and may be implemented as a laptop computer and a mobile phone that can be used by at least one user (e.g., an employee, a guest, or a partner), respectively, and a number of wired devices 962-3, 962-4 that connect to the AS and may be implemented as a camera and a desktop computer, respectively. The DSs 952-1, 952-2, the HEs 954-1, 954-2, the AS 956, the wireless AP 960, and/or the communications devices 962-1, 962-2, 962-3, 962-4 depicted in FIG. 9 may be similar to or the same as the DS 352, the HE 354, the AS 356, the wireless AP 360, and/or the communications devices 362-1, 362-2, 362-3, 362-4 depicted in FIG. 3, respectively. In some embodiments, at least one additional network device, such as a wireless sensor configured to measure and monitor network information at the customer site 114, is included in the network 950. In the embodiment depicted in FIG. 9, the network 950 (e.g., the DSs 952-1, 952-2) is connected to a customer router and firewall 946, which may be similar to or the same as the customer router and firewall 346 depicted in FIG. 3. The customer router and firewall 946 may be connected to a public network, e.g., the Internet. In some embodiments, the network 350 is connected to other network elements, such as an authentication server (e.g., a RADIUS server), a DHCP server, and/or a WAN. A difference between the network 950 depicted in FIG. 9 and the network 350 depicted in FIG. 3 is that in a redundant deployment, multiple DSs and multiple HEs are included in the network 950. A wired traffic overlay tunnel may be established between the AS 956 and the HE 954-1 or 954-2. A wireless traffic overlay tunnel may be established between the wireless AP 960 and the HE 954-1 or 954-2.

Figure 10:
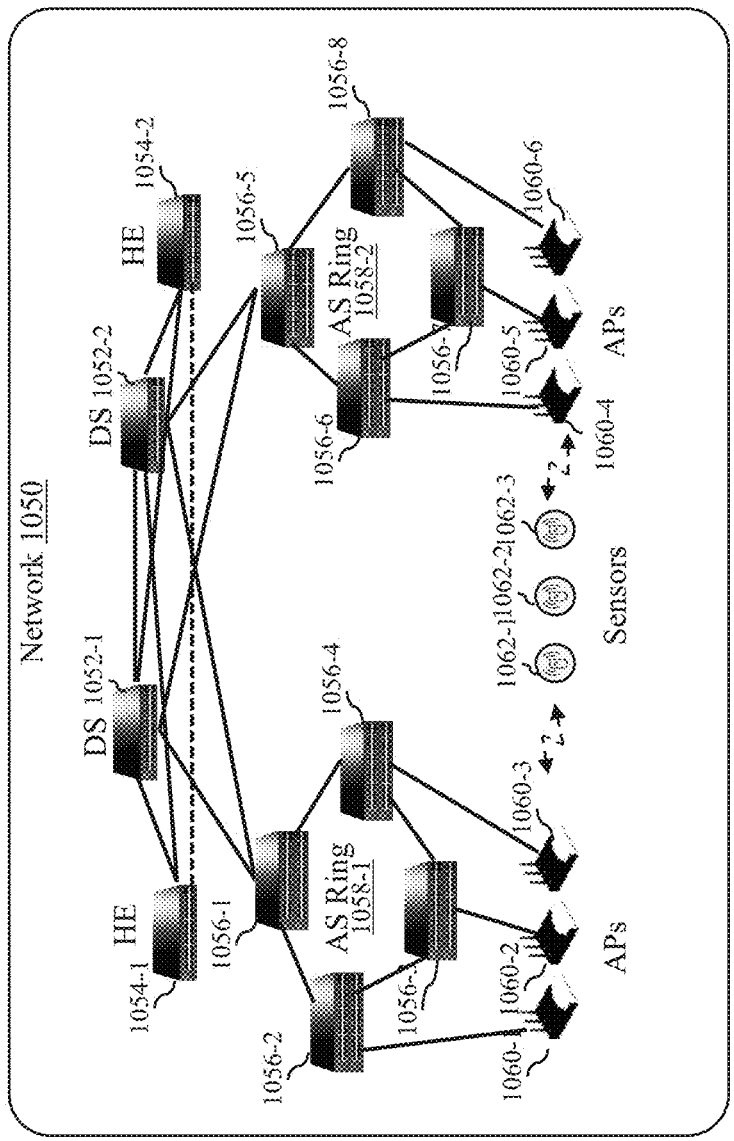
FIG. 10 depicts an embodiment of a network that can be deployed at the customer site depicted in FIG. 1.

FIG. 10 depicts an embodiment of a network 1050 that can be deployed at the customer site 114 depicted in FIG. 1. The network 1050 depicted in FIG. 10 is one possible embodiment of the deployed network 150 at the customer site 114 depicted in FIG. 1. However, the deployed network 150 at the customer site 114 depicted in FIG. 1 is not limited to the embodiment shown in FIG. 10. In some embodiments, the network 1050 is a basic building block for providing connectivity as a service and is a replicable block that can be scaled (e.g., expanded) to meet any deployment need. In the embodiment depicted in FIG. 10, the network 1050 includes a pair of distribution switches (DSs) or distribution layer switches 1052-1, 1052-2 that are aggregation switches functioning as a bridge between core layer switches and access layer switches, a pair of head ends (HEs) or gateways 1054-1, 1054-2, a number of optional access switches (Ass) 1056-1, 1056-2, 1056-3, 1056-4, 1056-5, 1056-6, 1056-7, 1056-8 connected in rings 1058-1, 1058-2 that can interact with lower level devices (e.g., wireless APs), a number of wireless APs 1060-1, 1060-2, 1060-3, 1060-4, 1060-5, 1060-6 connected to the ASs, and a number of wireless sensors 1062-1, 1062-2, 1062-3 that wirelessly connect to the wireless APs and are configured to measure and monitor network information at the customer site 114. In some embodiments, the network 1050 does not include access switches and the wireless APs are directly connected to the DS 1052-1 and/or the DS 1052-2. In some embodiments, at least one of the DSs 1052-1, 1052-2, the HEs 1054-1, 1054-2, the ASs 1056-1, 1056-2, 1056-3, 1056-4, 1056-5, 1056-6, 1056-7, 1056-8, the wireless APs 1060-1, 1060-2, 1060-3, 1060-4, 1060-5, 1060-6, and the wireless sensors 1062-1, 1062-2, 1062-3 depicted in FIG. 10 is implemented as the network device 204 depicted in FIG. 2. In some embodiments, at least one additional network device, such as a laptop, a desktop PC, or a mobile phone, that can be used by at least one user (e.g., an employee, a guest, or a partner), is included in the network 1050. In some embodiments, the network 1050 is connected to other network elements, such as an authentication server (e.g., a RADIUS server), a DHCP server, and/or a WAN. A wired traffic overlay tunnel may be established between the AS 1056-1, 1056-2, 1056-3, 1056-4, 1056-5, 1056-6, 1056-7, or 1056-8 and the HE 1054-1 or 1054-2. A wireless traffic overlay tunnel may be established between the wireless AP 1060-1, 1060-2, 1060-3, 1060-4, 1060-5, or 1060-6 and the HE 1054-1 or 1054-2.

Figure 11:
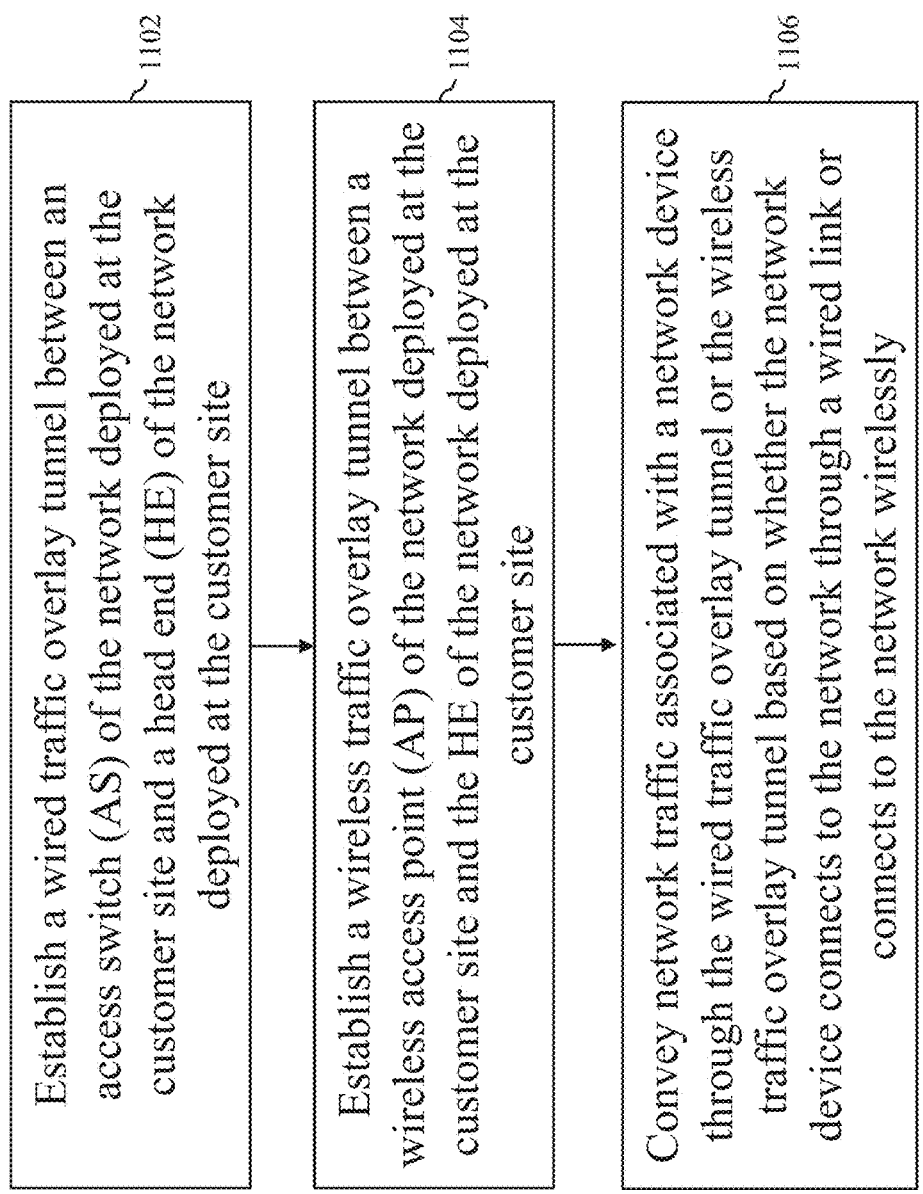
FIG. 11 is a process flow diagram of a method for network traffic management of a network deployed at a customer site accordance to an embodiment of the invention.

FIG. 11 is a process flow diagram of a method for network traffic management of a network deployed at a customer site accordance to an embodiment of the invention. According to the method, at block 1102, a wired traffic overlay tunnel is established between an access switch (AS) of the network deployed at the customer site and a head end (HE) of the network deployed at the customer site. At block 1104, a wireless traffic overlay tunnel is established between a wireless access point (AP) of the network deployed at the customer site and the HE of the network deployed at the customer site. At block 1106, network traffic associated with a network device is conveyed through the wired traffic overlay tunnel or the wireless traffic overlay tunnel based on whether the network device connects to the network through a wired link or connects to the network wirelessly. In some embodiments, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel when the network device connects to the network through the wired link and conveying the network traffic associated with the network device through the wireless traffic overlay tunnel when the network device connects to the network wirelessly. In some embodiments, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel or the wireless traffic overlay tunnel based on whether the network device connects to the network through the wired link or connects to the network wirelessly using a network layer architecture of the network. In some embodiments, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel or the wireless traffic overlay tunnel based on whether the network device connects to the network through the wired link or connects to the network wirelessly using a data plane of the HE. In some embodiments, establishing the wired traffic overlay tunnel between the AS of the network deployed at the customer site and the HE of the network deployed at the customer site includes at the AS, detecting that a network port becomes operational and sending a tunnel request to the HE, and at the HE, creating the wired traffic overlay tunnel and sending a response back to the wireless AP. In some embodiments, at the HE, creating the wired traffic overlay tunnel and sending the response back to the wireless AP includes at the HE, creating the wired traffic overlay tunnel and sending the response back to the wireless AP using a control plane and a data plane of the HE. In some embodiments, establishing the wireless traffic overlay tunnel between the wireless AP of the network deployed at the customer site and the HE of the network deployed at the customer site includes creating an interface using the wireless AP and sending a tunnel request from the wireless AP to the HE, and at the HE, creating the wireless traffic overlay tunnel and sending a response back to the wireless AP. In some embodiments, at the HE, creating the wireless traffic overlay tunnel and sending the response back to the wireless AP includes at the HE, creating the wireless traffic overlay tunnel and sending the response back to the wireless AP using a control plane and a data plane of the HE. In some embodiments, conveying the network traffic associated with the network device through the wired traffic overlay tunnel or the wireless traffic overlay tunnel based on whether the network device connects to the network through the wired link or connects to the network wirelessly includes when a packet is received from a wireless client, mapping a basic service set identifier (BSSID) associated with the packet to the wireless traffic overlay tunnel and transmitting the packet within the wireless traffic overlay tunnel after link layer information is removed from the packet. In some embodiments, conveying the network traffic associated with the network device through the wired traffic overlay tunnel or the wireless traffic overlay tunnel based on whether the network device connects to the network through the wired link or connects to the network wirelessly includes when a packet is received from a wired client, mapping a network port associated with the packet to the wired traffic overlay tunnel and transmitting the packet within the wired traffic overlay tunnel after link layer information is removed from the packet. In some embodiments, at least one of the wired traffic overlay tunnel and the wireless traffic overlay tunnel comprises a Generic Routing Encapsulation (GRE) tunnel or a Virtual Extensible Local Area Network (VXLAN). In some embodiments, the HE is connected to the wireless AP through the AS. In some embodiments, conveying the network traffic associated with the network device through the wired traffic overlay tunnel or the wireless traffic overlay tunnel based on whether the network device connects to the network through the wired link or connects to the network wirelessly includes conveying the network traffic associated with the network device through the wired traffic overlay tunnel when the network device connects to the AS through the wired link and conveying the network traffic associated with the network device through the wireless traffic overlay tunnel when the network device wirelessly connects to the wireless AP. The network device may be similar to, the same as, or a component of the network device 204 depicted in FIG. 2, the network devices 362-1, 362-2, 362-3, 362-4 depicted in FIG. 3, the network devices 962-1, 962-2, 962-3, 962-4 depicted in FIG. 9, and/or the wireless sensors 1062-1, 1062-2, 1062-3 depicted in FIG. 10. The AS may be similar to, the same as, or a component of the AS 356 depicted in FIG. 3, the AS 956 depicted in FIG. 9, and/or the ASs 1056-1, 1056-2, 1056-3, 1056-4, 1056-5, 1056-6, 1056-7, 1056-8 depicted in FIG. 10. The HE may be similar to, the same as, or a component of the HE 354 depicted in FIG. 3, the HEs 954-1, 954-2 depicted in FIG. 9, and/or the HEs 1054-1, 1054-2 depicted in FIG. 10. The wireless AP may be similar to, the same as, or a component of the wireless AP 360 depicted in FIG. 3, the wireless AP 960 depicted in FIG. 9, and/or the wireless APs 1060-1, 1060-2, 1060-3, 1060-4, 1060-5, 1060-6 depicted in FIG. 10. The network may be similar to, the same as, or a component of the network 150 depicted in FIG. 1, the network 350 depicted in FIG. 3, the network 950 depicted in FIG. 9, and/or the network 1050 depicted in FIG. 10. The customer site may be similar to, the same as, or a component of the customer site 114 depicted in FIG. 1.

Figure 12:
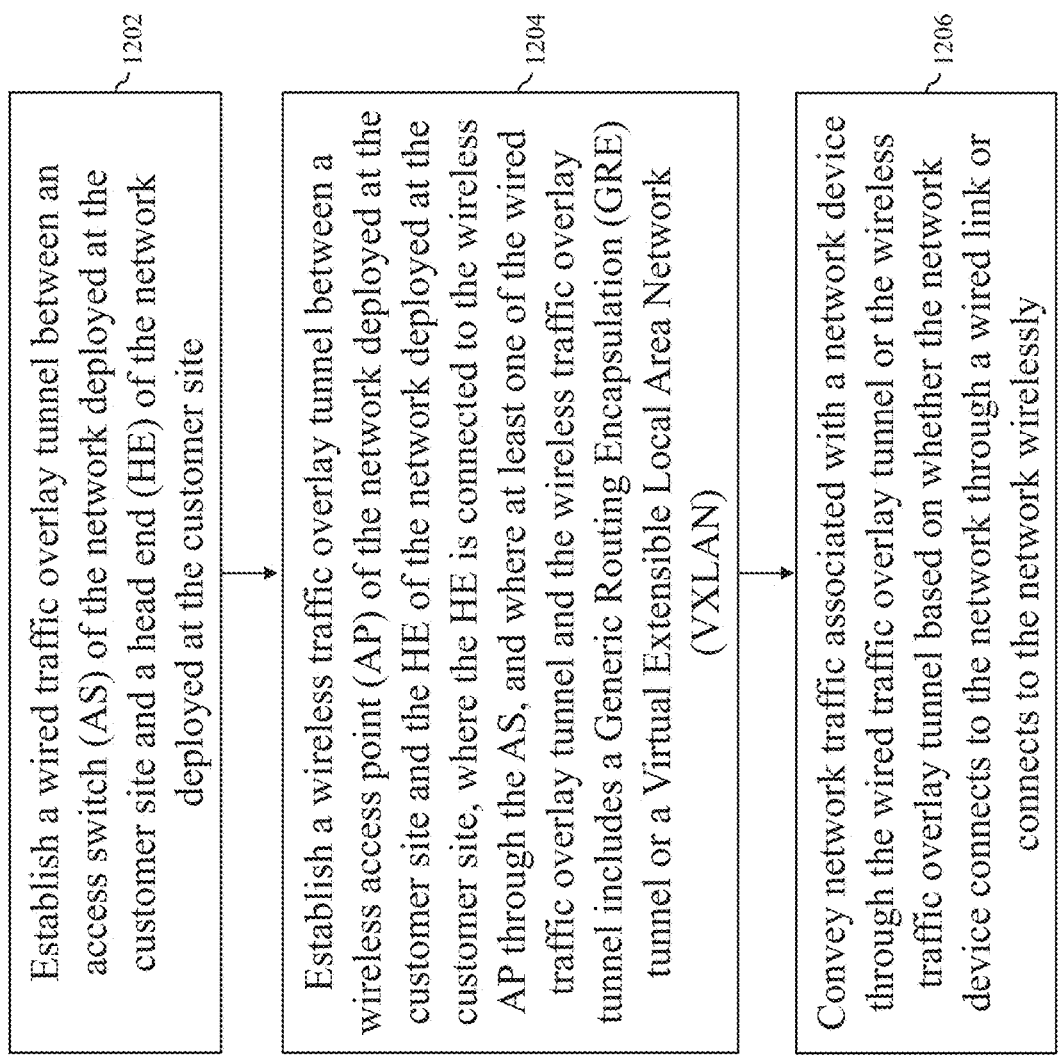
FIG. 12 is a process flow diagram of a method for network traffic management of a network deployed at a customer site accordance to another embodiment of the invention.

FIG. 12 is a process flow diagram of a method for network traffic management of a network deployed at a customer site accordance to an embodiment of the invention. According to the method, at block 1202, a wired traffic overlay tunnel is established between an AS of the network deployed at the customer site and an HE of the network deployed at the customer site. At block 1204, a wireless traffic overlay tunnel is established between a wireless AP of the network deployed at the customer site and the HE of the network deployed at the customer site, where the HE is connected to the wireless AP through the AS, and where at least one of the wired traffic overlay tunnel and the wireless traffic overlay tunnel includes a Generic Routing Encapsulation (GRE) tunnel or a Virtual Extensible Local Area Network (VXLAN). At block 1206, network traffic associated with a network device is conveyed through the wired traffic overlay tunnel or the wireless traffic overlay tunnel based on whether the network device connects to the network through a wired link or connects to the network wirelessly. The network device may be similar to, the same as, or a component of the network device 204 depicted in FIG. 2, the network devices 362-1, 362-2, 362-3, 362-4 depicted in FIG. 3, the network devices 962-1, 962-2, 962-3, 962-4 depicted in FIG. 9, and/or the wireless sensors 1062-1, 1062-2, 1062-3 depicted in FIG. 10. The AS may be similar to, the same as, or a component of the AS 356 depicted in FIG. 3, the AS 956 depicted in FIG. 9, and/or the ASs 1056-1, 1056-2, 1056-3, 1056-4, 1056-5, 1056-6, 1056-7, 1056-8 depicted in FIG. 10. The HE may be similar to, the same as, or a component of the HE 354 depicted in FIG. 3, the HEs 954-1, 954-2 depicted in FIG. 9, and/or the HEs 1054-1, 1054-2 depicted in FIG. 10. The wireless AP may be similar to, the same as, or a component of the wireless AP 360 depicted in FIG. 3, the wireless AP 960 depicted in FIG. 9, and/or the wireless APs 1060-1, 1060-2, 1060-3, 1060-4, 1060-5, 1060-6 depicted in FIG. 10. The network may be similar to, the same as, or a component of the network 150 depicted in FIG. 1, the network 350 depicted in FIG. 3, the network 950 depicted in FIG. 9, and/or the network 1050 depicted in FIG. 10. The customer site may be similar to, the same as, or a component of the customer site 114 depicted in FIG. 1.

This invention is primarily applicable to computer networking, but it is not tied to specific link or network technologies. For example, the same concepts could apply to alternate connectivity methods such as 5G instead of WLAN in the wireless case.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network traffic management of a network deployed at a customer site, the method comprising:
   establishing a wired traffic overlay tunnel between an access switch (AS) of the network deployed at the customer site and a head end (HE) of the network deployed at the customer site;
   establishing a wireless traffic overlay tunnel between a wireless access point (AP) of the network deployed at the customer site and the HE of the network deployed at the customer site; and
   conveying network traffic associated with a network device through the wired traffic overlay tunnel or the wireless traffic overlay tunnel based on whether the network device connects to the network through a wired link or connects to the network wirelessly.

2. The method of claim 1, wherein conveying the network traffic associated with the network device through the wired traffic overlay tunnel or the wireless traffic overlay tunnel based on whether the network device connects to the network through the wired link or connects to the network wirelessly comprises:
   conveying the network traffic associated with the network device through the wired traffic overlay tunnel when the network device connects to the network through the wired link; and
   conveying the network traffic associated with the network device through the wireless traffic overlay tunnel when the network device connects to the network wirelessly.

3. The method of claim 1, wherein conveying the network traffic associated with the network device through the wired traffic overlay tunnel or the wireless traffic overlay tunnel based on whether the network device connects to the network through the wired link or connects to the network wirelessly comprises conveying the network traffic associated with the network device through the wired traffic overlay tunnel or the wireless traffic overlay tunnel based on whether the network device connects to the network through the wired link or connects to the network wirelessly using a network layer architecture of the network.

4. The method of claim 1, wherein conveying the network traffic associated with the network device through the wired traffic overlay tunnel or the wireless traffic overlay tunnel based on whether the network device connects to the network through the wired link or connects to the network wirelessly comprises conveying the network traffic associated with the network device through the wired traffic overlay tunnel or the wireless traffic overlay tunnel based on whether the network device connects to the network through the wired link or connects to the network wirelessly using a data plane of the HE.

5. The method of claim 1, wherein establishing the wired traffic overlay tunnel between the AS of the network deployed at the customer site and the HE of the network deployed at the customer site comprises:
at the AS, detecting that a network port becomes operational and sending a tunnel request to the HE; and
at the HE, creating the wired traffic overlay tunnel and sending a response back to the wireless AP.

6. The method of claim 5, wherein at the HE, creating the wired traffic overlay tunnel and sending the response back to the wireless AP comprises at the HE, creating the wired traffic overlay tunnel and sending the response back to the wireless AP using a control plane and a data plane of the HE.

7. The method of claim 1, wherein establishing the wireless traffic overlay tunnel between the wireless AP of the network deployed at the customer site and the HE of the network deployed at the customer site comprises:
creating an interface using the wireless AP and sending a tunnel request from the wireless AP to the HE; and
at the HE, creating the wireless traffic overlay tunnel and sending a response back to the wireless AP.

8. The method of claim 7, wherein at the HE, creating the wireless traffic overlay tunnel and sending the response back to the wireless AP comprises at the HE, creating the wireless traffic overlay tunnel and sending the response back to the wireless AP using a control plane and a data plane of the HE.

9. The method of claim 1, wherein conveying the network traffic associated with the network device through the wired traffic overlay tunnel or the wireless traffic overlay tunnel based on whether the network device connects to the network through the wired link or connects to the network wirelessly comprises:
when a packet is received from a wireless client, mapping a basic service set identifier (BSSID) associated with the packet to the wireless traffic overlay tunnel; and
transmitting the packet within the wireless traffic overlay tunnel after link layer information is removed from the packet.

10. The method of claim 1, wherein conveying the network traffic associated with the network device through the wired traffic overlay tunnel or the wireless traffic overlay tunnel based on whether the network device connects to the network through the wired link or connects to the network wirelessly comprises:
when a packet is received from a wired client, mapping a network port associated with the packet to the wired traffic overlay tunnel; and
transmitting the packet within the wired traffic overlay tunnel after link layer information is removed from the packet.

11. The method of claim 1, wherein at least one of the wired traffic overlay tunnel and the wireless traffic overlay tunnel comprises a Generic Routing Encapsulation (GRE) tunnel or a Virtual Extensible Local Area Network (VXLAN).

12. The method of claim 1, wherein the HE is connected to the wireless AP through the AS.

13. The method of claim 12, wherein conveying the network traffic associated with the network device through the wired traffic overlay tunnel or the wireless traffic overlay tunnel based on whether the network device connects to the network through the wired link or connects to the network wirelessly comprises:
conveying the network traffic associated with the network device through the wired traffic overlay tunnel when the network device connects to the AS through the wired link; and
conveying the network traffic associated with the network device through the wireless traffic overlay tunnel when the network device wirelessly connects to the wireless AP.

14. A system for network traffic management of a network deployed at a customer site, the system comprising:
memory; and
one or more processors configured to:
establish a wired traffic overlay tunnel between an access switch (AS) of the network deployed at the customer site and a head end (HE) of the network deployed at the customer site;
establish a wireless traffic overlay tunnel between a wireless access point (AP) of the network deployed at the customer site and the HE of the network deployed at the customer site; and
convey network traffic associated with a network device through the wired traffic overlay tunnel or the wireless traffic overlay tunnel based on whether the network device connects to the network through a wired link or connects to the network wirelessly.

15. The system of claim 14, wherein the one or more processors are further configured to:
convey the network traffic associated with the network device through the wired traffic overlay tunnel when the network device connects to the network through the wired link; and
convey the network traffic associated with the network device through the wireless traffic overlay tunnel when the network device connects to the network wirelessly.

16. The system of claim 14, wherein the one or more processors are further configured to convey the network traffic associated with the network device through the wired traffic overlay tunnel or the wireless traffic overlay tunnel based on whether the network device connects to the network through the wired link or connects to the network wirelessly using a network layer architecture of the network.

17. The system of claim 14, wherein the one or more processors are further configured to:
using the AS, detect that a network port becomes operational and sending a tunnel request to the HE; and
using the HE, create the wired traffic overlay tunnel and sending a response back to the wireless AP.

18. The system of claim 14, wherein the one or more processors are further configured to:
create an interface using the wireless AP and sending a tunnel request from the wireless AP to the HE; and
using the HE, create the wireless traffic overlay tunnel and sending a response back to the wireless AP.

19. The system of claim 14, wherein the one or more processors are further configured to:

when a packet is received from a wireless client, map a basic service set identifier (BSSID) associated with the packet to the wireless traffic overlay tunnel; and transmit the packet within the wireless traffic overlay tunnel after link layer information is removed from the packet.

20. A method for network traffic management of a network deployed at a customer site, the method comprising:

establishing a wired traffic overlay tunnel between an access switch (AS) of the network deployed at the customer site and a head end (HE) of the network deployed at the customer site;

establishing a wireless traffic overlay tunnel between a wireless access point (AP) of the network deployed at the customer site and the HE of the network deployed at the customer site, wherein the HE is connected to the wireless AP through the AS, and wherein at least one of the wired traffic overlay tunnel and the wireless traffic overlay tunnel comprises a Generic Routing Encapsulation (GRE) tunnel or a Virtual Extensible Local Area Network (VXLAN); and conveying network traffic associated with a network device through the wired traffic overlay tunnel or the wireless traffic overlay tunnel based on whether the network device connects to the network through a wired link or connects to the network wirelessly.

* * * * *